(12) United States Patent
Chen

(10) Patent No.: US 8,692,507 B2
(45) Date of Patent: Apr. 8, 2014

(54) MULTIPLE STAGE HETEROGENEOUS HIGH POWER BATTERY SYSTEM FOR HYBRID AND ELECTRIC VEHICLE

(76) Inventor: Jack Yajie Chen, Troy, MI (US)

( * ) Notice: Subject to any disclaimer, the term of this patent is extended or adjusted under 35 U.S.C. 154(b) by 109 days.

(21) Appl. No.: 12/845,687

(22) Filed: Jul. 28, 2010

(65) Prior Publication Data

US 2012/0025753 A1 Feb. 2, 2012

(51) Int. Cl.
*H02J 7/00* (2006.01)
(52) U.S. Cl.
USPC ............... 320/103; 320/104; 320/109
(58) Field of Classification Search
CPC ......... Y02E 60/12; H02J 7/0054; Y02T 90/14
USPC .......................................... 320/103, 104, 109
See application file for complete search history.

(56) References Cited

U.S. PATENT DOCUMENTS

| | | | | |
|---|---|---|---|---|
| 5,869,950 A * | 2/1999 | Hoffman et al. | ............... | 320/103 |
| 8,030,884 B2 * | 10/2011 | King et al. | .................. | 320/104 |
| 2009/0103341 A1 * | 4/2009 | Lee et al. | ...................... | 363/124 |
| 2010/0320959 A1 * | 12/2010 | Tomberlin et al. | ............ | 320/101 |
| 2011/0221392 A1 * | 9/2011 | Gale et al. | ..................... | 320/109 |

* cited by examiner

*Primary Examiner* — M'Baye Diao

(57) ABSTRACT

A multiple stage battery system has significantly improved battery life in hybrid and electric motorized vehicle. At least two segments of battery packs are charged and discharged with two different battery management strategies, one handles transient energy needs and the other copes with cruise energy needs. The primary segment of battery are charged and discharged within a controlled State of Charge (SOC) range at a set point, it stores relatively less energy but supplies relative high impulse current during charge and discharge. The secondary segments have larger energy capacity, and are charged and discharged at constant current mode in deep cycling, near complete full charge and full discharge. These two segments of batteries could be different type of chemistry, i.e. NiMH, NiCD and Li-ion. This results in longer overall battery life and higher usable capacity for high power battery operations.

7 Claims, 3 Drawing Sheets

MULTIPLE STAGE HETEROGENEOUS HIGH POWER BATTERY SYSTEM FOR HYBRID AND ELECTRIC VEHICLE

BACKGROUND

1. Field of the Invention

This disclosure relates to improving battery life and adding larger capacity into existing high power battery system, wherein a battery management system and DC/DC converter and controller are added to control the energy release rate into power consumption device, such as hybrid and electric vehicle, from the secondary battery modules, thereby creating heterogeneous high power battery system.

2. Description of Related Art

Over the past few years, as global warming is becoming a major concern for the community and fossil fuel output is declining, there are active developments of electric vehicles and hybrid electric vehicles, which use high power battery modules that are over 1000 Watt-hour. The high power battery module is a major power source for an electric vehicle and is assistant power source for hybrid electric vehicles. A battery module usually consists of multiple packs or cells of battery with a battery management system. A battery management system monitors the voltage, current and estimates State Of Charge (SOC) of the battery module.

Majority of the high power batteries utilized in electric vehicles and hybrid vehicles are lead-acid and nickel-metal hydrate batteries. These batteries have very limited life cycle if the charging and discharging at unexpected high current rate in deep cycling. Like Toyota Prius(c) vehicle, the battery state of charge is maintained at 40% to 80% range in order to have a long design service life (100,000 miles to 150,000 miles). That means 60% of the battery capacity is not utilized during daily driving.

Some new battery chemistry, like Lithium cobalt oxide, Lithium iron phosphate, Lithium manganese oxide, has promising higher life cycles under control environment, lighter weight and higher energy density. However it also suffers from shorten life if discharged at high current rate and over-charged. And it is less durable as lead-acid and nickel-metal hydrate batteries under frustrating current demand during a vehicle transient from one speed to the other.

Currently, one common way to convert hybrid electric vehicle into higher energy storage plug-in hybrid electric vehicles is adding a new string of battery module directly to the stock battery module in parallel with relay control circuitry. It causes serious imbalance issues that reduce battery life because of different battery chemistry and different nominal voltage level. The combined battery modules can only charge and discharge at a limited SOC range set by the vehicle manufacturer. A significant portion of the capacity is not utilized as the result. There are some experimental techniques to 'spoof' OEM vehicle controller to force it to take advantage of the larger battery capacity. The side effect of doing that is higher cost and impacting the original manufacturer components and having higher emissions as designed since the original control algorithm is altered.

Another way to convert hybrid electric vehicle into plug-in hybrid electric vehicle is completely replacing the stock battery module with higher capacity one. This addresses battery imbalance issue but it is still has to limit the usable capacity in order to prolong battery life. And it is very expensive and causes environmental waste of the old battery module.

Wruck teaches dual battery system in U.S. Pat. No. 5,223, 351, issued Jun. 29, 1993, titled Dual battery system. The problem with connecting two battery systems with different nominal voltage directly without isolation and converter control, is that the first battery with higher voltage will charge the second battery resulting in shifting of energy from the first battery to the second. As time goes on, two batteries are going to have the same voltage. It becomes a normal two parallel strings of battery packs.

In this disclosure, the primary goal is achieving longer battery life and higher capacity by managing multiple stage heterogeneous high power battery system with primary battery module handling transient load and secondary module(s) coping with constant load while have minimum impact to the primary battery module.

SUMMARY

The present invention is intended to prolong battery life and increase usable capacity by segregating batteries into multiple modules connected through a DC/DC Converter and Controller (DDCC). The primary battery module which operates in shallow cycling and at a set SOC level, handles the transient load demand when the vehicle is accelerating or decelerating while the secondary modules support constant load with deep cycling.

The primary battery module (PBM) consists of multiple battery cells in series with smaller total capacity, providing large impulse energy during motorized vehicle acceleration and absorbing large impulse re-generating energy during motorized vehicle braking. The SOC level of the PBM is maintained at a set range, for example between 40% and 80% so that it could absorbs energy during braking without over-charging the PBM cells and provides large impulse current without over-discharging the PBM cells.

The secondary battery module (SBM) consists of multiple battery cells in series with larger total capacity. It is coupled to PBM through a DDCC, providing smaller constant energy for propelling motorized vehicle or charging the PBM during vehicle stoppage or low propelling power demand period, like low speed or cruise speed, etc. SBM is discharged almost fully, at close to zero percent SOC and is charged almost fully, at close to one hundred percent SOC. Since the charge and discharge of SBM is at limited power level and predictable, the battery cells can be utilized at full capacity without over-charging and over-discharging, in which conditions would significantly shorten battery life.

DDCC monitors the voltages and currents of both PBM and SBM, and estimates SOC levels of both battery modules. It stops charging PBM if the SOC of PBM is reached the upper limit of the controlled range or the SOC of SBM is dropped below the lower limit of the controlled range. DDCC extracts electric energy from SBM and converts it to the voltage that matches PBM's. The direct current output of the DDCC is limited at an adjustable level.

DESCRIPTION OF ILLUSTRATIVE EMBODIMENTS

Figure 1:
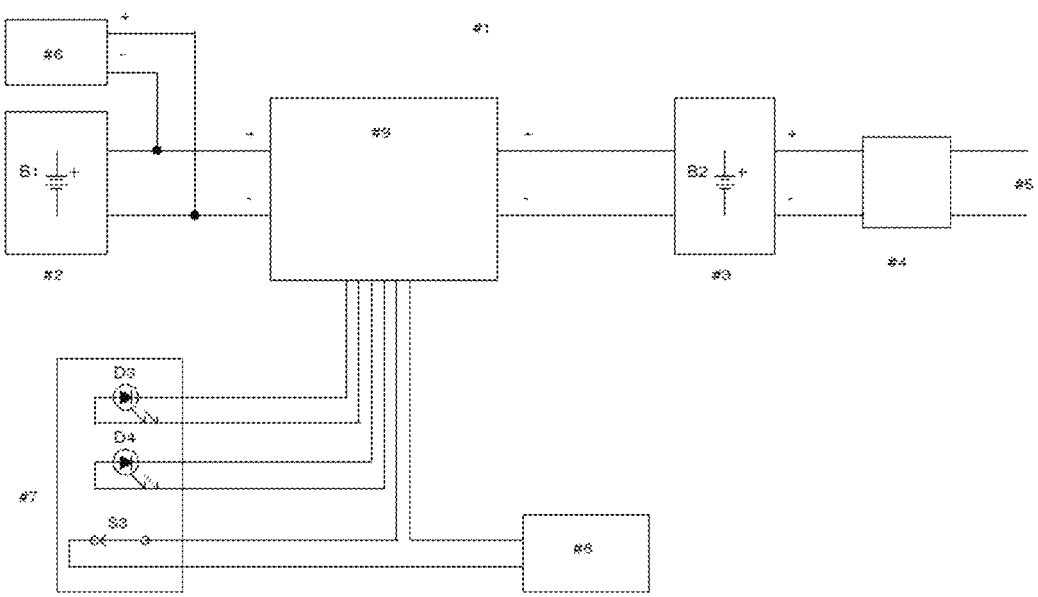
FIG. 1 is diagram of multiple stage battery system constructed in accordance with the invention.

In FIG. 1, a multiple stage battery system 1 in accordance to this invention comprises of primary battery module (PBM)

2, secondary battery module (SBM) 3, charger 4, human interface panel 7, EV Control Unit 8, motor drive module 6, DC/DC Converter and Controller (DDCC) 9, and power source 5.

External power source 5 charges SBM 3 through charger 4 to close to full capacity. Upon start signal input from EV control unit 8, SBM 3 through DDCC 9 provides constant direct current to supplement electric powertrain operation, and/or charges PBM 2 when the PBM's SOC is below adjustable high limit. DDCC 9 stops outputting direct current if the PBM is fully charge or the brake re-generation energy is flowing into the PBM 2. When SBM's SOC drops close to zero, DDCC 9 turns on battery low indicator and turns off output to PBM and electric powertrain.

Figure 2:
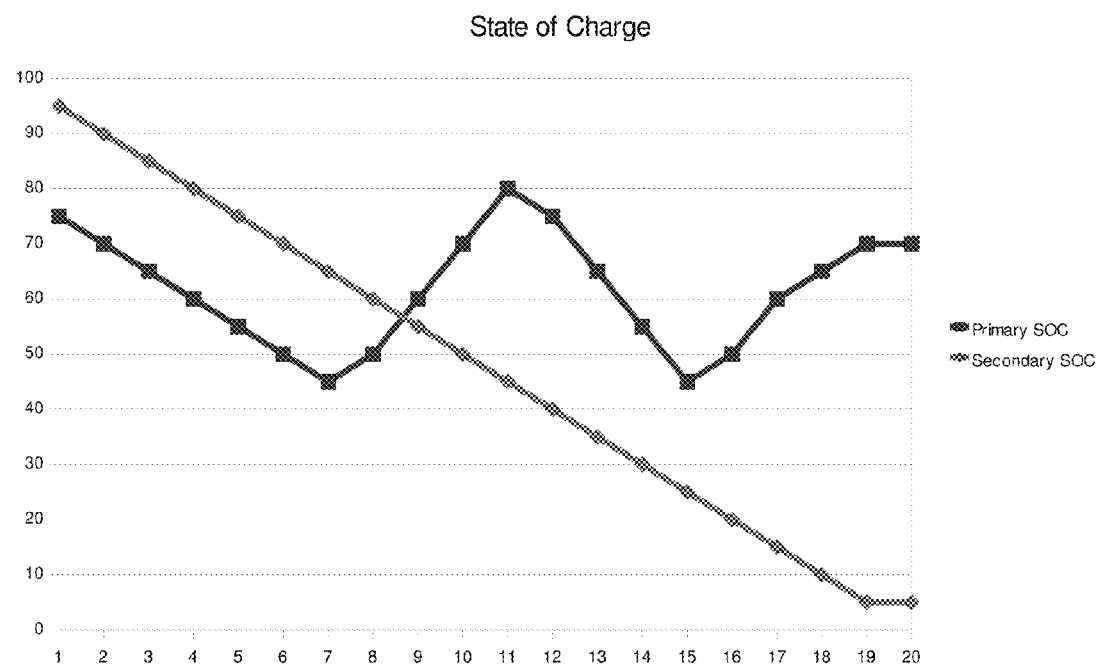
FIG. 2 is a comparison State of Charge chart between primary and secondary battery module in accordance with the invention.

FIG. 2 illustrates the state of charge level in PBM and SBM. The control strategy of PBM is charging and discharging the energy so that the state of charge level is at a set target level within a certain range. In the example, a target level is set at 60% and the range is 20% above and below the target level. The control strategy of SBM is charging and discharging the energy so that the output power level is limited from close to one hundred percent SOC to close to zero percent SOC. The battery life in both PBM and SBM is prolonged as the result of these control strategies.

Figure 3:
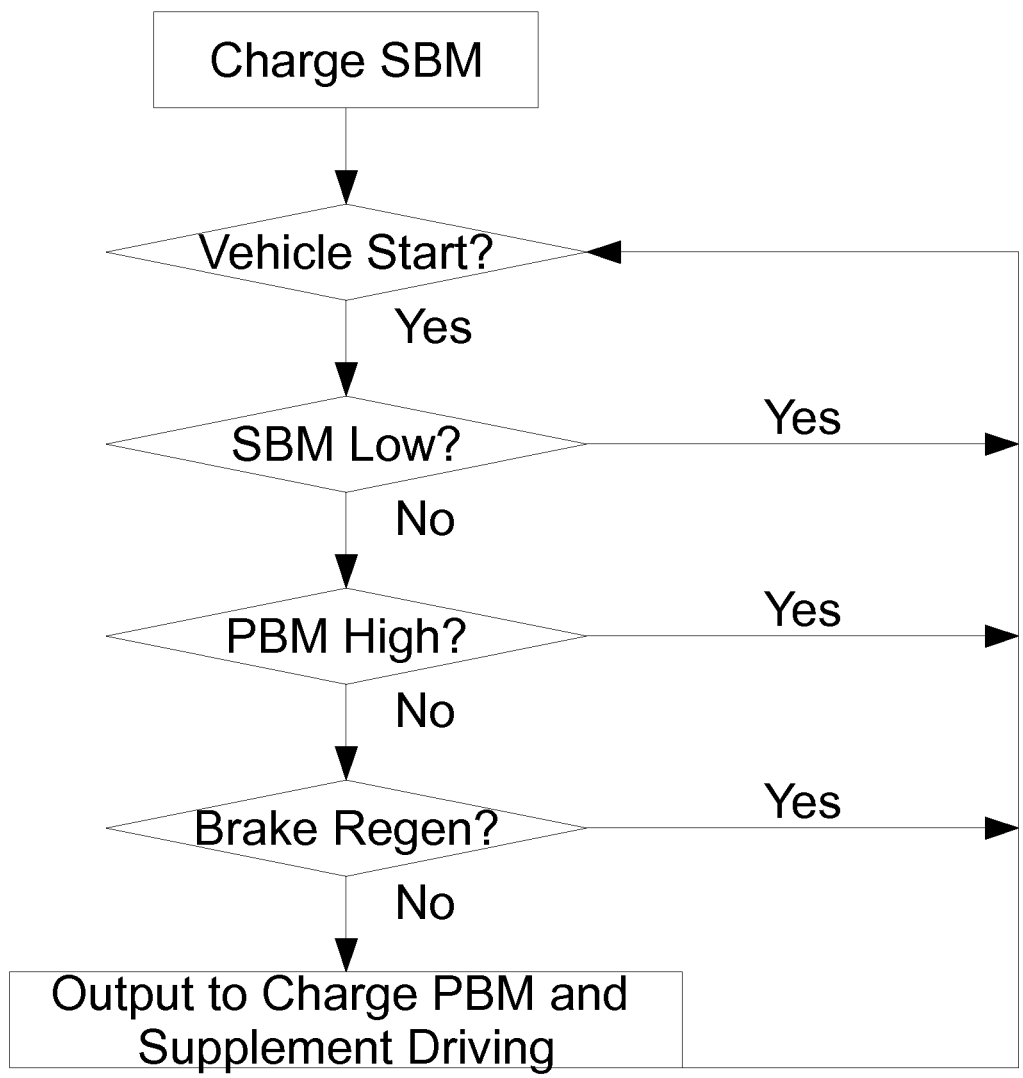
FIG. 3 is a flow chart to illustrate DDCC control logic in accordance with the invention.

FIG. 3 illustrates the control logic of the DC/DC Converter and Controller (DDCC). After the SBM is charged fully, DDCC waits for start command from EV control unit, then it checks for the SOC of the SBM. If the SBM SOC is not at a set low level and PBM is not over a set high limit and the brake regeneration is not charging the PBM, DDCC outputs voltage and direct current to the PBM at a limited power level.

DCDC has means, like but not limited to potentiometer, digital dial to adjust output current and voltage level to match the power consumption device like plug-in hybrid or electric motorized vehicle. The human interface panel 7 enable a driver to turn on or off the DDCC. One indicator informs the driver when DDCC is outputting power and another indicator shows if the SBM is low on power. DDCC would be shut off if SBM is low on power in order to protect the battery cells from over-discharging.

Since PBM and SBM are isolated and connected through DDCC, PBM and SBM could have different nominal voltage and different type/chemistry. For example, Toyota's Prius hybrid vehicle uses Nickel-Metal Hydrate batteries as the traction power source. By adding large amount of Lithium Phosphate batteries and DDCC in accordance to this invention, one can convert a hybrid vehicle into a plug-in hybrid electric vehicle which can be charged with at home or at work with a standard AC outlet.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A multiple stage traction battery system, comprising:
   a primary traction battery module coupled to an electric motor;
   a secondary traction battery module coupled to said electric motor and said primary traction battery module;
   a DC/DC converter and controller, coupled to said primary traction battery module and said secondary traction battery module, that adjusts an output power limit and that moves energy from said secondary traction battery module to said primary traction battery module, and maintains preset state of charge ranges in said primary traction battery module and said secondary traction battery module;
   wherein said DC/DC converter and controller maintains a narrower state of charge range in said primary traction battery module than said secondary traction battery module, thereby allowing for higher charge/discharge rate and lower utilization rate in said primary traction battery than said secondary traction battery; and
   a charger, that charges said secondary traction battery module from an external power source based on a state of charge of said secondary traction battery module.

2. A multiple stage traction battery system according to claim 1 having different type of chemistry in said primary and secondary traction battery modules.

3. A multiple stage traction battery system according to claim 1 having different nominal voltage in said primary and secondary traction battery modules.

4. A multiple stage traction battery system according to claim 1 having means to balance cell energy level in said primary and secondary traction battery modules.

5. A multiple stage traction battery system according to claim 1 having means to turn off said DC/DC converter and controller.

6. A multiple stage traction battery system according to claim 1 having means to indicate that said DC/DC converter and controller is powered on.

7. A multiple stage traction battery system according to claim 1 having means to indicate that said secondary traction battery modules' energy level is low.

* * * * *